United States Patent [19]

Mausezahl et al.

[11] 3,947,407
[45] Mar. 30, 1976

[54] FIBRE-REACTIVE DYESTUFFS

[75] Inventors: Dieter Mausezahl, Biel-Benken; Alexander Wohlkonig, Arlesheim, both of Switzerland

[73] Assignee: Ciba-Geigy AG, Basel, Switzerland

[22] Filed: Sept. 16, 1974

[21] Appl. No.: 506,638

Related U.S. Application Data

[63] Continuation-in-part of Ser. No. 201,547, Nov. 23, 1971, abandoned.

[30] Foreign Application Priority Data

Nov. 12, 1970 Switzerland.................. 16743/70

[52] U.S. Cl....... 260/239 EQ; 260/146 R; 260/148; 260/149; 260/150; 260/151; 260/152; 260/158; 260/160; 260/162; 260/163; 260/178; 260/192; 260/195; 260/196; 260/198; 260/205; 260/240 E; 260/270 T; 260/299; 260/314.5; 260/374; 260/510; 8/41 R; 8/41 B

[51] Int. Cl.²............... C07D 203/12; C07D 203/10; C07D 203/08

[58] Field of Search............................ 260/239 EQ

[56] References Cited
UNITED STATES PATENTS
3,072,636   1/1963   Furst et al..................... 260/239 E Primary Examiner—Alton D. Rollins
Assistant Examiner—Mark L. Berch
Attorney, Agent, or Firm—Joseph G. Kolodny; Edward McC. Roberts; Prabodh I. Almaula

[57] ABSTRACT

The invention relates to reactive dyestuffs containing as reactive group a radical of the formula

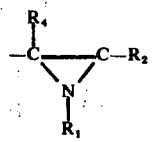

wherein $R_1$ is hydrogen, $C_1$-$C_5$-alkyl, $C_1$-$C_5$-alkyl substituted by chlorine, bromine, cyano, hydroxy, $C_1$-$C_4$-alkoxy, $C_1$-$C_4$-alkoxcarbonylamino, di-$C_1$-$C_4$-alkylamino, sulfo, phenyl or phenyl substituted by $C_1$-$C_4$-alkyl, sulfo or $C_1$-$C_4$-alkoxycarbonyl and $R_2$, $R_3$ and $R_4$ are hydrogen or $C_1$-$C_5$-alkyl.

1 Claim, No Drawings

FIBRE-REACTIVE DYESTUFFS

This is a continuation-in-part application of our co-pending application Ser. No. 201,547 now abandoned, filed Nov. 23, 1971.

The invention relates to new dyestuffs which contain a reactive aziridine radical of the formula

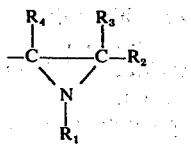
(1)

wherein $R_1$, $R_2$, $R_3$ and $R_4$ represent substituents. Examples of the substituents represented by $R_1$ to $R_4$ are hydrogen or halogen atoms, cyano, nitro, carboxy, amino, acylamino, alkylsulphonyl, acyl, acyloxy, alkoxycarbonyl, alkoxy, aryloxy, aryl and alkyl groups.

As substituents the alkyl groups may contain halogen atoms, cyano, hydroxy, or alkoxy groups or the like. The substituents $R_2$, $R_3$ and $R_4$ are preferably low molecular alkyl groups or especially hydrogen atoms and $R_1$ is a hydrogen atom or an alkyl radical such, for example, as a methyl, ethyl, propyl, isopropyl, butyl, amyl, β-chloro- or β-bromethyl, β-cyanoethyl, β-hydroxyethyl, γ-hydroxypropyl, methoxy-methyl, β-methoxy ethyl, γ-methoxypropyl, ethoxymethyl, β-ethoxyethyl, γ-ethoxypropyl, or γ-isopropoxypropyl radical. The new compounds may also contain more than one radical of the formula (1), thus for example two or three etc.

The radicals of the formula (1) are reactive radicals. By reactive radicals are meant those radicals that are capable of reacting with the hydroxyl groups of the cellulose or with the amino groups of polyamides to form a covalent chemical bond.

The radicals of the formula (1) can be bonded directly, or via a bridge member, to the remaining part of the compound. Exemplary of such bridge members are: —O—, —S—, CO—, —SO₂—, —NH—, —N(alkyl)—, —N(aryl)—, CONH—, —SO₂NH— and —SO₂N(alkyl)—. Preferably the radical of the formula (1) is bonded to the remaining part of the compound via an —N(R)—CO—group, wherein R represents a low molecular alkyl radical or especially a hydrogen atom.

As examples of the substituted or unsubstituted alkyl radicals defined by R there may be cited: low molecular alkyl radicals, such as methyl, ethyl, propyl and butyl, which may contain substituents such as methoxy, ethoxy and hydroxy groups.

Preferred compounds are therefore those that contain a reactive aziridine radical of the formula

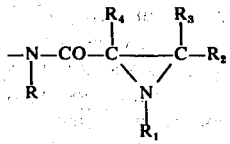
(2)

wherein R, $R_2$, $R_3$ and $R_4$ represent low molecular alkyl or especially hydrogen atoms, and wherein $R_1$ is a hydrogen atom or especially an alkyl radical.

Compounds which are above all preferred are those that contain a radical of the formula (2), in which $R_1$ is a substituted alkyl radical, especially compounds that contain a radical of the formula

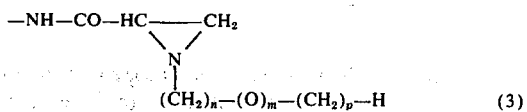
(3)

wherein $n$ and $p$ represent positive integers, including 0, and $m$ is 0 or 1.

Suitable compounds which contain a reactive aziridine radical of the formula (1) are all compounds belonging to groups of substances in whose use the formation of a particularly firm bond to a substrate, in particular a fibre material, is necessary or desirable. As such groups of substances there may be mentioned textile auxiliaries such, for example, as impregnating agents for giving a permanent finish to cellulose fibres (improving the resistance to creasing and shrinking), for "easy case" and the anti-felt finishing of wool, for imparting water- repellent and oil-repellent characteristics, for preventing fibres from becoming electrically charged (anti-static agents), for flameproofing, for preservation (fungicides and insecticides) or for lessening soil retention. Particularly important groups of substances which may be mentioned are fluorescent agents, optical brighteners and, above all, dyestuffs or compounds which are suitable as fixing components for dyestuffs free from reactive groups for the subsequent build up of dyestuffs on the fibre, for example for coupling.

The dyestuffs may be of any known class of dyestuffs and belong preferably to the mono- or polyazo series or to the nitro, anthraquinone or phthalocyanine series. They contain preferably at least one water-solubilising group, in particular a carboxylic acid or sulphonic acid group. If desired, the dyestuffs may also contain coodinatively bonded metal, for example coordinatively bonded copper, chromium or cobalt. In addition, basic dyestuffs are also suitable.

The azo compound of the formula

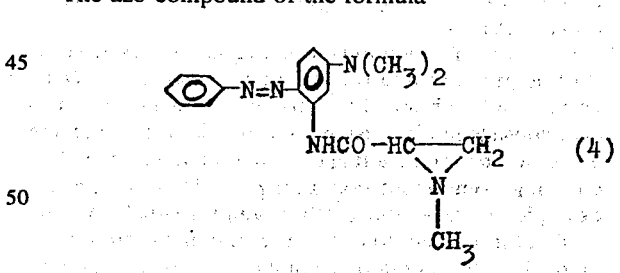
(4)

may be cited as an example of a dyestuff of the kind according to the invention.

The invention relates furthermore to a process for the manufacture of compounds which contain a radical of the formula (1). The process consists in condensing compounds which contain a radical of the formula

(5)

in which each X represents a halogen atom, or a radical of the formula

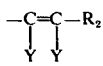
(6)

in which one Y represents a halogen atom and the other Y a hydrogen or halogen atom, with primary amines of the formula $H_2N-R_1$, in which $R_1$, $R_2$, $R_3$ and $R_4$ have the meanings given above.

Examples of radicals of the formulae (5) and (6) are in particular halogenated ethyl or ethenyl (vinyl) radicals which are bonded via an -NH-CO-group, i.e., halogenated propionyl or acrylamino radicals such, for example, as $\alpha,\beta$-dichloro- or $\alpha,\beta$-dibromopropionyl, $\alpha$- or $\beta$-chloro- or bromacrylamino or $\alpha,\beta$-dichloro- or $\alpha,\beta$-dibromacrylamino radicals.

The compounds containing a radical of the formula (5) or (6) which are used as starting materials are manufactured in known manner, for example by condensing a compound which contains an amino group of the formula -NHR, in which R has the meaning given above, with halides or anhydrides of corresponding halogenated aliphatic carboxylic acids. As example of such halides or anhydrides there may be cited: $\alpha,\beta$-dichloro- or dibromopropionyl chloride, $\alpha$-chloro- or $\alpha$-bromacrylic chloride, $\beta$-chloro- or bromacrylic chloride, $\alpha,\beta$-dichloro- or dibromacrylic chloride, trichloroacrylic chloride, chlorocrotonyl chloride, and chloromaleic anhydride.

The condensation with the acid halides or anhydrides is carried out advantageously in the presence of acid acceptors such, for example, as sodium carbonate, and in an organic solvent or at relatively low temperature in an aqueous medium.

Thhe $\alpha$-bromacrylic acid derivatives can likewise be obtained from the corresponding $\alpha,\beta$-dibromopropionic acid derivatives by splitting of hydrogen bromide. Thus a compound which contains an $\alpha,\beta$-dibromopropionyl radical can be treated with alkaline agents, for example alkali metal hydroxides, preferably at room temperature. The corresponding-$\alpha$-bromacrylic derivative is formed which is isolated by conventional methods.

The dyestuff compounds of the azo series used as starting products and which contain at least one -NHR group can be obtained by various processes. One process consists in diazotising an aromatic primary amine and coupling the resulting diazonium compound with a coupling component containing an -NHR group. As examples of aromatic primary amines which may be used in this manner to obtain the aminoazo compounds there may be mentioned aniline, o-, m- and p-toluidines, o-, m- and p-anisidines, o-, m and p-chloroanilines, 2:5-dichloroaniline, $\alpha$- and $\beta$-naphthylamine, 2:5-dimethylaniline, 5-nitro-2-aminoanisole, 4-aminodiphenyl, aniline-2-, 3- and 4-carboxylic acids, 2-aminodiphenylether, 2-, 3- or 4-aminobenzene sulphonamide or sulphomonomethyl- or ethylamides or sulphondimethyl- or sulphondiethylamides, dehydrothio-p-toluidine monosulphonic acid or dehydrothio-p-toluidine disulphonic acid, aniline-2-, -3- and -4- sulphonic acids, aniline-2:5-disulphonic acid, 2:4-dimethylaniline-6-sulphonic acid, 3-aminobenzotrifluoride-4-sulphonic acid, 4-chloro-5-methylaniline-2-sulphonic acid, 5-chloro-4-methylaniline-2-sulphonic acid, 3-acetylaminoaniline-6-sulphonic acid, 4-acetylaminoaniline-2-sulphonic acid, 4-chloroaniline-2-sulphonic acid, 3:4-dichloroaniline-6-sulphonic acid, 4-methylaniline-2-sulphonic acid, 3-methylaniline-6-sulphonic acid, 2:4-dimethoxyaniline-6-sulphonic acid, 4-methoxyaniline-2-sulphonic acid, and 5-methoxyaniline-2-sulphonic acid, 2:5-dichloroaniline-4-sulphonic acid, 2-naphthylamine-4:8- and 6:8-disulphonic acids, 1-naphthylamine-2-, 4-, 5-, 6- or 7-monosulphonic acid, 1-naphthylamine-3:6-disulphonic acid, 2-naphthylamine-3:6- and 5:7-disulphonic acids, 2-naphthylamine-3:6:8-trisulphonic acid, m- and p-nitroaniline, 4-nitroaniline-2-sulphonic acid, 3-nitroaniline-6-sulphonic acid, m- or p-aminoacetanilide and 4-amino-2-acetylamino-toluene-5 -sulphonic acid.

As example of coupling components which can be used there may be mentioned 2-amino- and 2-methylamino-5-naphthol-7-sulphonic acids, 2-amino and 2-methylamino-8-naphthol-6-sulphonic acids, 1-amino and 1-ethylamino-8-naphthol-6-sulphonic acids and corresponding 3:6- and 4:6-disulphonic acids, 1-(3'-or 4'-aminobenzoylamino)-8-naphthol-3:6- and 4:6-disulphonic acids, aniline, o- and m- anisidines, o- and m-toluidines, 2:5-dimethylaniline, 3-amino-4-methoxytoluene, 2:5-dimethoxyaniline, N-methylaniline, N-ethyl-o-toluidine, N-methyl-n-anisidine, 3-methylamino-4-methoxytoluene, 1-(3¹-aminophenyl)-3-methyl-, carboxy-, and -carboethoxy-5-pyrazolone, 1-(4¹-aminophenyl)-3-methyl-, -carboxy-, and -carboethoxy-5-pyrazolones and 1-(4¹-amino-3¹-carboxyphenyl)-3-methyl-5-pyrazolone.

The aminoazo compounds which are to be used in the process of the invention are not restricted to compounds containing only one azo group. Disazo compounds which may be used may be obtained for example by tetrazotisation of an aromatic diamine containing two primary amino groups and coupling the tretrazo compound so obtained with 2 molecular proportions of one of the above-defined coupling components, or with 1 molecular proportion of each of two of the above-defined coupling components, or with 1 molecular proportion of one of the above defined coupling components and with 1 molecular proportion of a coupling component not containing an amino group. As examples of such aromatic diamines there may be mentioned benzidine, 3:3¹-dimenthoxybenzidine, benzidine-2:2¹-disulphonic acid, benzidine-3:3¹-dicarboxylic acid, benzidine-3:3¹-diglycollic acid and 4:4¹-diaminostilbene-2:2¹-disulphonic acid. Alternatively disazo or polyazo compounds may be obtained by the use of primary aromatic amines or diamines containing azo groups. As examples of such primary aromatic amines or diamines containing azo groups which may be used there may be mentioned 4-aminobenzene-4¹-sulphonic acid, 4¹-amino-2¹-methylphenylazo-2-naphthalene-4:8-disulphonic acid and 4-amino-5-methoxy-2-methyl-4¹-nitro-2¹-sulphoazobenzene.

Instead of starting from amines which are free from -NHR groups, it is also possible to couple a coupling component which optionally contains an -NHR group with a diazonium compound which contains an -NHR group. Such diazonium compounds may be obtained by methods known from the art, by the diazotisation of aromatic primary amines containing a second amino group or containing a mono-substituted amino group. As examples of such aromatic primary amines there may be mentioned p-phenylenediamine, 1:4-phenylenediamine-2-sulphonic acid, 1:4-phenylenediamine-2-carboxylic acid and 1:4-diaminophthalene-2-suphonic acid. As examples of coupling components which may be used in this manner there may be mentioned the coupling components listed above and also β-naphthol, 2-naphthol-6- or -7-sulphonic acid, 2-naphthol-3:6- or 6:8-disulphonic acid, 1-naphthol-4-sulphonic acid, 1-phenyl-3-methyl-5-pyrazolone, 1-(4¹-sulphophenyl)-3-methyl-5-pyrazolone, 1-(2¹:5¹-dichloro-4¹-sulphophenyl)-3-methyl-5-pyrazolone, 2-benzoylamino-5-naphthol-7-sulphonic acid, 1-benzoylamino-8-naphthol-3:6- or 4:6-disulphonic acid, phenol, p-cresol, acetoacetanilide and acetoacet-2-methoxy-aniline-5-sulphonic acid.

Further processes for the manufacture of the dyestuff compounds of the azo series containing an -NHR group and which may be used in the process according to the invention, consist in reducing a dyestuff which contains nitro groups or treating an azo or polyazo compound containing at least one acylamino group with aqueous acid or aqueous alkali in order to cause hydrolysis of the acylamino group or groups. Such azo or polyazo compounds may be obtained from aromatic primary amines and/or coupling components containing acyl-amino groups. As examples of such aromatic primary amines there may be mentioned monoacetylbenzidine, 4-amino-1-acetylaminonaphthalene-6-sulphonic acid, 4-amino-4¹-acetylaminodiphenyl-3-sulphonic acid, 4-amino-3-sulphoacetanilide, 3-amino-4-sulphoacetanilide and 4-amino-4¹-acetylamino-stilbene-2:2¹-disulphonic acid, and as examples of such coupling components there may be mentioned 2-acetylamino-5-naphthol-7-sulphonic acid, 2-N-acetyl-N-methylamino-5-naphthol-7-sulphonic acid, 2-acetylamino-and 2-N-acetyl-N-methylamino-8-naphthol-6-sulphonic acids and 1-acetylamino-8-naphthol-3:6- and 4:6-disulphonic acids.

An interesting group of azo dyestuffs that can be obtained as described above are those of the formula

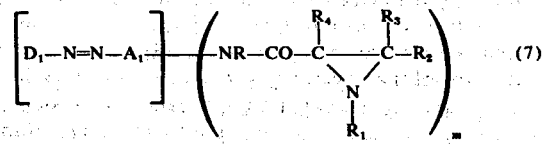

wherein
m is 1 or 2 R is hydrogen or $C_1 - C_5$ - alkyl $R_2$, $R_3$ and $R_4$ are hydrogen or $C_1 - C_5$- alkyl, $R_1$ is hydrogen, $C_1$-$C_5$-alkyl, $C_1$-$C_5$-alkyl substituted by chlorine, bromine, cyano, hydroxy, $C_1$-$C_4$-alkoxy, $C_1$-$C_4$-alkoxycarbonylamino, di-$C_1$-$C_4$-alkylamino, sulfo, phenyl or phenyl substituted by $C_1$-$C_4$-alkyl, sulfo or $C_1$-$C_4$-alkoxycarbonyl and $D_1$ is phenyl or naphthyl optionally substituted by sulfo, sulfonamido, N-mono-or N,N-di-$C_1$-$C_4$-alkylsulfonamido, $C_1$-$C_4$-alkyl, $C_1$-$C_4$-alkoxy, chloro, bromo, cyano, nitro, trifluoromethyl, carboxy, phenyl, phenoxy, phenylazo, $C_1$-$C_4$-alkanoylamino, benzoylamino or $C_1$-$C_4$-alkoxycarbonylamino and $A_1$ is o-hydroxynaphthyl optionally substituted by 1 or 2 sulfonic acid groups, or $A_1$ is phenyl optionally substituted by chloro, bromo, $C_1$-$C_4$-alkyl, $C_1$-$C_4$-alkoxy, carboxy, $C_1$-$C_4$-alkynoylamino, benzoylamino, $C_1$-$C_4$-alkoxycarbonylamino or N,N-di-$C_1$-$C_4$-alkylamino.

Interesting azo dyestuffs with heterocyclic coupling components are those of the formula

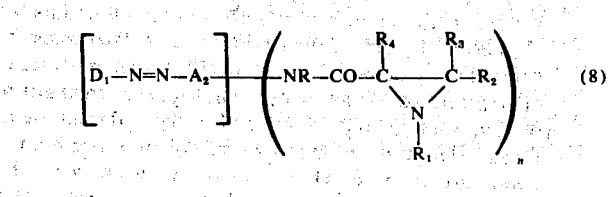

wherein
R, $R_1$, $R_2$, $R_3$, $R_4$ and $D_1$ have the manings given above, n is 1 or 2 and $A_2$ is a residue of the formula

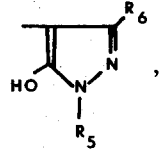 , 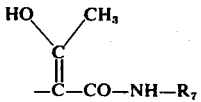

wherein $R_5$ is phenyl or phenyl substituted by chloro, bromo, sulfo, $C_1$-$C_4$-alkyl, or nitro, $R_6$ is methyl, carboxy or carbathoxy and $R_7$ is phenyl or phenyl substituted by chloro, bromo, $C_1$-$C_4$-alkyl, $C_1$-$C_4$-alkoxy, nitro and wherein the aziridine groups are attached to $D_1$ and/or to $R_5$ or $R_7$.

As examples of dyestuff compounds of the anthraquinone series which may be used in the process of the invention there may be mentioned anthraquinone compounds containing a group of the formula -NHR as herein-before defined, attached to an alkylamino or an arylamino group which is itself attached to an alpha-position of the anthraquinone nucleus. As examples of such anthraquinone compounds there may be mentioned 1-amino-4-(4'-aminoanilino-)anthraquinone-2:3'-disulphonic acid and the corresponding 2:3':5- and 2:3:6-trisulphonic acids, 1-amino-4-(4''-amino-4'-benzoylaminoanilino)-anthraquinone-2:3-disulphonic acid and the corresponding-2:3':5-trisulphonic acid, 1-amino-4-[4'-(4''-aminophenylazo-)anilino-]anthraquinone-2:2'':5-trisulphonic acid, 1-amino-4-(4'-amino-3'-carboxyanilino-)anthraquinone-2:5-disulphonic acid 1, amino-4-(3¹-aminoanilino-)anthraquinone-2:4':5-trisulphonic acid and the corresponding 2:4'-disulphonic acid, 1-amino-4'-[4''-aminophenyl-)anilino-]-anthraquinone-2:3'':5-trisulphonic acid, 1-amino-4-(4'-methylamino)anilinoanthraquinone-2:3'-disulphonic acid and the corresponding 2:3':5-trisulphonic acid, 1-amino-4-(4'-n-butylamino)-anilinoanthraquinone-2:3'-disulphonic acid. 1-amino-4-(4'-methylamino-3'-carboxyanilino-) anthraquinone-2-sulphonic acid, 1-amino-4-(3'-betahydroxyethylamino-)anilinoanthraquinone-2:5-disulphonic acid, 1-(4'-aminoanilino)-anthraquinone-2:3'-disulphonic acid and 1-amino-4-(4'-amino-2'-methoxy anilino)anthraquinone-2:3'-disulphonic acid.

Such dyestuff compounds of the anthraquinone series may themselves be obtained from anthraquinone compounds, containing a halogen atom or a nitro group attached to the appropriate alpha-position of the anthraquinone nucleus, or from the leuco derivative of a 1:4-dihydroxy, -diamino- or -aminohydroxy- anthraquinone, by reacting the appropriate anthraquinone compound with at least one molecular proportion of an aliphatic or an aromatic diamine.

Dyestuff compounds of the phthalocyanine series which may be used in the process of the invention are preferably metal-containing phthalocyanines, such as copper phthalocyanines, containing at least one water-solubilising group such as a sulphonic acid group, and at least one group of the formula -NHR as hereinbefore defined. The -NHR group or groups may be attached directly to the benz-rings of the phthalocyanine nucleus or they may be attached thereto through a divalent bridging radical for example -phenylene-, —CO-phenylene, —SO$_2$—phenylene, —NH—phenylene, —S—phenylene, —O—phenylene, —CH$_2$S—phenylene—, —CH$_2$O-phenylene, —CH$_2$—phenylene-, —SCH$_2$—phenylene, —SO$_2$CH$_2$—phenylene—, —SO$_2$NR$_1$—phenylene—CH$_2$-, —SO$_2$NR$_1$-arylene-, —NR$_1$CO$_1$—phenylene, —NR$_1$SO$_2$-phenylene, —SO$_2$O-phenylene-, —CH$_2$-, —CH$_2$NR$_1$-phenylene, —CH$_2$NH.CO-phenylene-, —SO$_2$NR$_1$-alkylene-, —CH$_2$NR$_1$-alkylene-, —CONR$_1$-phenylene-CH$_2$-, —CONR$_1$-arylene-, —SO$_2$— and —CO—. In the above divalent bridging radicals, R$_1$ stands for hydrogen, alkyl or cycloalkyl, arylene stands for an aromatic divalent bridging radical wherein the terminal valence bonds may be attached to the same or different nuclei, and alkylene stands for an aliphatic divalent radical which may include hetero-atoms such as nitrogen as well as carbon in the chain of atoms, for example it may stand for the radical.

and the phenylene groups may be substituted for example by halogen, alkyl and alkoxy.

As examples of aromatic divalent bridging radicals denoted by arylene there may be mentioned aromatic nuclei, for example a benzene nucleus, a naphthalene nucleus, an acridine nucleus and a carbazole nucleus, which nuclei may bear further substituents, and radicals of the formula

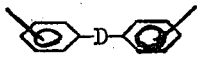

wherein the benzene rings may bear further substituents and wherein —D— stands for a bridging group, for example —CH=CH—, —NH—, —S—, —O—, —SO$_2$—, —NO=N—, —N=N—, —NH.CO.NH—, —CO.NH—, —O.CH$_2$CH$_2$O— and

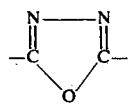

As specific examples of dyestuff compounds of the phthalocyanine series which may be used in the process of the invention there may be mentioned copper phthalocyanine-4-N-(4-amino-3-sulphenyl-)-sulphonamide-4$^1$:4$^{11}$:4$^{111}$-trisulphonic acid, cobalt phthalocyanine-4:4$^1$-di-N-(3$^1$-amino-4$^1$-sulphophenyl-) -carbonamide-4$^{11}$:4$^{111}$-dicarboxylic acid and copper-4-(4$^1$-amino-3$^1$-sulphobenzoyl-)phthalocyanine.

There may also be used mixtures of aminophthalocyanines, for example there may be used a mixture of approximately equal parts of copper phthalocyanine-N-(4-amino-3-sulphophenyl-)sulphonamide trisulphonic acid and copper phthalocyanine di-N-(4-amino-3-sulphophenyl-)sulphonamide disulphonic acid.

The aminophthalocyanines which contain a sulphonic acid can be obtained either by the sulphonation of known phthalocyanines containing primary or secondary amino groups or by synthesis from mixtures of phthalic acid derivatives and sulphonated phthalic acid derivatives. Oleum, for example, is used as sulphonating agent e.g. a 20 percent solution of sulphur trioxide in sulphuric acid. They can also be obtained by heating together suitable derivatives of sulphonated phthalic acid and substituted phthalic acids by means of generally known methods, for example by heating together a mixture of 4-sulphophthalic anhydride and 4-p-nitrobenzoylphthalic anhydride, urea, cupric chloride and ammonium molybdate in o-dichlorobenzene at about 150°C. Phthalocyanines which are used as starting products can also be obtained by sulphonating the corresponding primary and secondary amines or by reacting a primary (or secondary N-alkyl or cycloalkyl)-nitroaniline with a phthalocyanine which contains chloromethyl and sulphonic acid or carboxylic acid groups. Such aminophthalocyanines can also be obtained by reacting a phthalocyanine containing chlorosulphonyl groups with a monoacetyl alkylene diamine in the presence of water, and treating the product so obtained (which contains both sulphonamide and sulphonic acid groups) with aqueous alkali to hydrolyse the acetylamino group: or by reacting a phthalocyanine containing chloromethyl and sulphonic or carboxylic acid groups with a monoacetyl alkylene diamine and treating the product so obtained with aqueous alkali to hydrolyse the acetylamino groups. They can furthermore be obtained by directly sulphonating or heating together a mixture of suitable carboxy or sulphophthalic acid derivatives with substituted phthalic acid derivatives, for example by heating the anhydrides with urea and a catalyst in an organic solvent and reducing the nitrophthalocyanine sulphonic or carboxalic acid or hydrolising the acylaminophthalocyanine sulphonic or carboxylic acid so obtained or by reacting a phthalocyanine compound containing carboxylic acid chloride groups with a diaminobenzene sulphonic acid or carboxylic acid or with an aminobenzene sulphonic acid or an aminobenzoic acid which also contains a nitro group and reducing the nitro compound so obtained; or finally by reacting a phthalocyanine compound containing carboxylic acid chloride groups with an N-aminobenzyl-) acetamide and subsequently hydrolising the product so obtained with aqueous alkali.

Dyestuff compounds of the nitro series which may be used in the process of the invention are preferably those of the formula:-

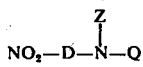

wherein D stands for a naphthalene or benzene nucleus which may be further substituted, the nitrogen atom N is in the ortho position to the nitro group, Z stands for hydrogen or for a hydrocarbon radical which may be substituted, Q stands for hydrogen or for an organic radical attached to the nitrogen through a carbon atom, provided that Q and Z are not both hydrogen, and wherein Q may be connected to Z when Z is a hydrocarbon radical or to D, in the ortho position to the nitrogen atom N, to form a heterocyclic ring, and which contain at least one group of the formula —NHR, as hereinbefore defined.

As specific examples of dyestuff compounds containing at least one —NHR group, as hereinbefore defined, which may be used in the process of the invention, there may be mentioned the compounds of the following classes without, however, limiting the classes to those specifically described. 1. Monoazo compounds of the formula:

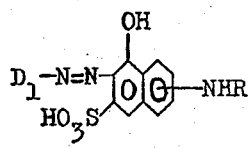    IV wherein $D_1$ represents an at most di-cyclic aryl radical which is free from azo groups and NHR groups, the —NHR group is preferably attached to the 6-, 7- or 8-position of the naphthalene nucleus, and which may contain a sulphonic acid group in the 5- or 6- position of the naphthalene nucleus.

$D_1$ may represent a radical of the naphthalene or benzene series which is free from azo substituents, for example a stilbene, diphenyl, benzthiazolylphenyl or diphenylamine radical. Also in this case are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical, especially those which contain a —$SO_3H$ group in ortho position to the azo link; the phenyl radical may be further substituted for example, by halogen atoms such as chlorine, alkyl radicals such as methyl, acylamino groups such as acetylamino and alkoxy radicals such as methoxy.

2. Disazo compounds of formula IV, wherein $D_1$ stands for a radical of the azobenzene, azonaphthalene or phenylazonaphthalene series and the naphtalene nucleus is substituted by the NHR group, and optionally by sulphonic acid as in class 1.

3. Monoazo compounds of the formula:

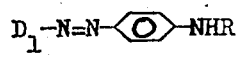    V wherein $D_1$ stands for an at most dicyclic aryl radical as described for class 1 and is preferably a disulphonaphthyl or a stilbene radical, and the benzene nucleus may contain further substituents such as halogen atoms, or alkyl, alkoxy, carboxylic, acid and acylamino groups.

4. Mono- or dis-azo compounds of the formula:

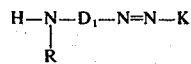    VI wherein $D_1$ represents an arylene radical such as a radical of the azobenzene, azonaphthalene or phenylazonaphthalene series, or preferably, an at most dicyclic arylene radical of the benzene or naphthalene series, and K represents the radical of a naphthol sulphonic acid or the radical of an enolised or enolisable keto-methylene compound (such as an acetoacetarylide or a 5-pyrazolone) having the OH group o- to the azo group. $D_1$ preferably represents a radical of the benzene series containing a sulphonic acid group.

5. Mono or dis-azo compounds of the formula:

    VII wherein $D_1$ represents a radical of the types defined for $D_1$ in classes 1 and 2 above and $K_2$ represents the radical of an enolisable ketomethylene compound (such as an acetoacetarylide or a 5-pyrazolone) having the —OH group in $\alpha$-position to the azo group.

6. The metal complex, e.g. the copper, chromium and cobalt complex compounds of those dyes of formulae (7), (8) IV, VI and VII (wherein $D_1$, K and $K_2$ have all the respective meanings stated) which contain a metallisable (for example, a hydroxyl, lower alkoxy or carboxylic acid) group ortho to the azo group in $D_1$.

7. Anthraquinone compounds of the formula:

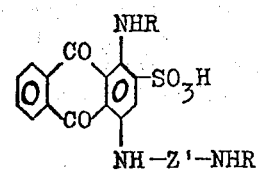

wherein the anthraquinone nucleus may contain an additionally sulphonic acid group in the 5-, 6-, 7- or 8-position and $Z^1$ represents a bridging group which is preferably a divalent radical of the benzene series, for example phenylene diphenylene, or 4,4'-divalent stilbene or azobenzene radicals. It is preferred that Z' should contain one sulphonic acid group for each benzene ring present.

An interesting group of dyestuffs are e.g. anthraquinone dyestuffs of the formula

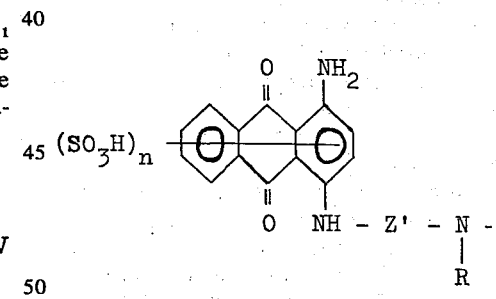

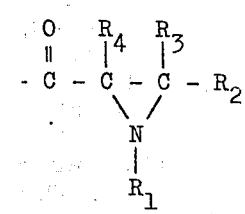

wherein
$n$ is 1 or 2
R is hydrogen or $C_1$-$C_5$-alkyl,
$R_2$, $R_3$ and $R_4$ are hydrogen or $C_1$-$C_5$-alkyl,
$R_1$ is hydrogen, $C_1$-$C_5$-alkyl, $C_1$-$C_5$-alkyl substituted by chlorine, bromine, cyano, hydroxy, $C_1$-$C_4$-alkoxy, $C_1$-$C_4$-alkoxycarbonylamino, di-$C_1$-$C_4$-alkylamino, sulfo, phenyl or phenyl substituted by $C_1$-$C_4$-alkyl, sulfo or $C_1$-$C_4$-alkoxycarbonyl and Z' is phenyl, phenyl substituted by sulfo, carboxy or methoxy, phenylazophenyl substituted by sulfo or diphenyl substituted by sulfo.

8. Phthalocyanine compounds of the formula:

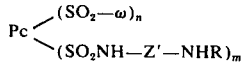

wherein Pc represents the nucleus of copper or nickel phthalocyanine, ω represents —OH and/or —$NH_2$, Z' represents a bridging group, preferably an aliphatic, e.g. a $C_1$-$C_4$-alkylene group or a cycloaliphatic or aromatic bridging group, such as the phenylene or sulfophenylen or phenylenmethylen group, n and m each represent 1,2 or 3 and may be the same or different provided that n+m, is not greater than 4.

9. Nitro dyestuffs of the formula:

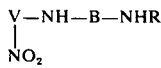

wherein V and B represent monocyclic aryl nuclei, the nitro group in V being ortho to the NH group.

In class 1
- 6-amino-1-hydroxy-2-($2^1$-sulfophenylazo)naphthalene-3-sulphonic acid,
- 6-methylamino-1-hydroxy-2-($4^1$-acetylamino-$2^1$-sulphophenylazo)naphthalene-3-sulphonic acid.
- 8-amino-1-hydroxy-2-($2^1$-sulphophenylazo)naphthalene-3:6-disulphonic acid,
- 8-amino-1-hydroxy-2-($4^1$-chloro-$2^1$-sulphophenylazo)-naphthalene-3:5-disulphonic acid,
- 7-amino-2($2^1$:$5^1$disulphophenylazo)-1-hydroxynaphthalene-3-sulphonic acid,
- 7-methylamino-2-($2^1$-sulphophenylazo)-1-hydroxynaphthalene-3-sulphonic acid,
- 7-methylamino-2-($4^1$-methoxy-$2^1$-sulphophenylazo)-1-hydroxynaphthalene-3-sulphonic acid,
- 8-($3^1$-aminobenzoylamino)1-hydroxy-2-($2^1$-sulphophenylazo) naphthalene-3:6-disulphonic acid,
- 8-amino-1-hydroxy-2:$2^1$-azonaphthalene-$1^1$:3:$5^1$:6-tetrasulphonic acid,
- 8-amino-1-hydroxy-2:$2^1$-azonaphthalene-$1^1$:3:$5^1$-trisulphonic acid,
- 6-amino-1-hydroxy-2:$2^1$-azonaphthalene-$1^1$,3,$5^1$-trisulphonic acid,
- 6-methylamino-1-hydroxy-2:$2^1$-azonaphthalene-$1^1$,3,$5^1$-trisulphonic acid,
- 7-amino-1-hydroxy-2,$2^1$-azonaphthalene-$1^1$,3-diisulphonic acid,
- 8-amino-1-hydroxy-2-($4^1$-hydroxy-$3^1$-carboxyphenylazo)-naphthalene-3,6-disulphonic acid,
- 6-amino-1-hydroxy-2-($4^1$-hydroxy-$3^1$-carboxyphenylazo)-naphthalene-3,5-disulphonic acid.

In class 2
- 8-amino-1-hydroxy-2-[$4^1$-($2^{11}$-sulphophenylazo)-$2^1$-methoxy-$5^1$-methylphenylazo]naphthalene-3,6-disulphonic acid,
- 8-amino-1-hydroxy-2-[$4^1$-($4^{11}$-methoxyphenylazo)-$2^1$-carboxyphenylazo]naphthalene-3,6-disulphonic acid,
- 8-amino-1-hydroxy-2-[$4^1$-($2^{11}$-hydroxy-$3^{11}$,$6^{11}$-disulpho-$1^{11}$-naphthylazo)-$2^1$-carboxyphenylazo]naphthalene-3,6-disulphonic acid,
- 4,$4^1$-bis($8^{11}$-amino-$1^{11}$-hydroxy-$3^{11}$,$6^{11}$-disulpho-$2^{11}$-naphthylazo)-3,$3^1$-dimethoxydiphenyl,
- 6-amino-1-hydroxy-2-[$4^1$-($2^{11}$-sulphophenylazo)-$2^1$-methoxy-$5^1$-methylphenylazo]naphtahlene-3,5-disulphonic acid.

In class 3
- 2-($4^1$-amino-$2^1$-methylphenylazo)-naphthalene-4:8-disulphonic acid,
- 2-($4^1$-amino-$2^1$-acetylaminophenylazo)naphthalene-5:7-disulphonic acid,
- 4-nitro-$4^1$-($4^{11}$-methylaminophenylazo)stilbene-2,$2^1$-disulphonic acid,
- 4-nitro-$4^1$-($4^1$-amino-$2^{11}$-methyl-$5^{11}$-methoxyphenylazo)-stilbene-2,$2^1$-disulphonic acid,
- 4-amino-$4^1$-($4^{11}$-methoxyphenylazo)-stilbene-2,$2^1$-disulphonic acid,
- 4-amino-2-methylazobenzene-$2^1$:$5^1$ -disulphonic acid.

In class 4
- 1-($2^1$,$5^1$-dichloro-$4^1$-sulphophenyl)-3-methyl-4-($3^{11}$-amino-$4^{11}$-sulphophenylazo)-5-pyrazolone,
- 1-(4-sulphophenyl)-3-carboxy-4-($4^{11}$-amino-$3^{11}$-sulphophenyl azo)-5-pyrazolone,
- 1-($2^1$-methyl-$5^1$-sulphophenyl)-3-methyl-4-($4^{11}$-amino-$3^{11}$-sulphophenylazo)-5-pyrazolone,
- 1-($2^1$-sulphophenyl)-3-methyl-4-($3^{11}$-amino-$4^{11}$-sulphophenyl-azo)-5-pyrazolone,
- 4-amino-$4^1$-($3^{11}$-methyl-$1^{11}$-phenyl-$4^{11}$-pyrazol-$5^{11}$-onyl-azo)stilbene-2,$2^1$-disulphonic acid,
- 4-amino-$4^1$-($2^{11}$-hydroxy-$3^{11}$,$6^{11}$-disulpho-$1^{11}$-naphthylazo)-stilbene-2,$2^1$-disulphonic acid,
- 8-acetylamino-1-hydroxy-2-($3^1$-amino-$4^1$-sulphophenylazo) naphthalene-3,6-disulphonic acid,
- 7-($3^1$-sulphophenylamino)-1-hydroxy-2-($4^1$-amino-$2^1$-carboxyphenylazo)-naphthalene-3-sulphonic acid,
- 8-phenylamino-1-hydroxy-2-($4^1$-amino-$2^1$-sulphonylazo) naphthalene-3,6-disulphonic acid,
- 6-acetylamino-1-hydroxy-2-($5^1$-amino-$2^1$-sulphophenylazo) naphthalene-3-sulphonic acid.

In class 5
- 1-($3^1$-aminophenyl)-3-methyl-4-($2^1$:$5^1$-disulphophenylazo)-5-pyrazolone, 1-($3^1$-aminophenyl)-3-carboxy-4-($2^1$-carboxy-$4^5$-sulphophenylazo)-5 -pyrazolone,
- 4-amino-$4^1$-[$3^{11}$-methyl-$4^{11}$-($2^{111}$,$5^{111}$-disulphophenylazo)-$1^{11}$-pyrazol-$5^{11}$-onyl]stilbene-2,$2^1$-disulphonic acid,
- 1-(3-aminophenyl)-3-carboxy-4-[$4^{11}$-($2^{111}$,$5^{111}$-disulphophenylazo)-$2^{11}$-methoxy-$5^{11}$-methylphenylazo]-5-pyrazolone.

In class 6
The copper complex of 8-amino-1-hydroxy-2-($2^1$-hydroxy-$5^{11}$-sulphophenylazo)naphthalene-3:6-disulphonic acid,
The copper complex of 6-amino-1-hydroxy-2-($2^1$-hydroxy-$5^1$-sulphophenylazo)-naphthalene-3-sulphonic acid,
The copper complex of 6-amino-1-hydroxy-2-($2^1$-hydroxy-$5^1$-sulphophenylazo)-naphthalene-3,5-disulphonic acid, The copper complex of 8-amino-1-hydroxy-2-(2¹-hydroxy-3¹-chloro-5¹-sulphophenylazo)naphtalene-3,6-disulphonic acid, The copper complex of 6-methylamino-1-hydroxy-2-(2¹-carboxy-5¹-sulphophenylazo)naphthalene-3-sulphonic acid, The copper complex of 8-amino-1-hydroxy-2-[4¹-(2¹¹-sulphophenylazo)-2¹-methoxy-5¹-methylphenylazo]-naphthalene-3,6-disulphonic acid, The copper complex of 6-amino-1-hydroxy-2-[4¹-(2¹¹,5¹¹-disulphophenylazo)-2¹methoxy-5¹-methylphenylazo]-naphthalene-3,5-disulphonic acid, The copper complex of 1-(3¹-amino-4¹-sulphophenyl)-3-methyl-4-[4¹¹-(2¹¹¹,5¹¹¹-disulphophenylazo)-2¹¹-methoxy-5¹¹-methylphenylazo]-5-pyrazolone, The copper complex of 7-)4¹-amino-3¹-sulphoanilino)-1-hydroxy-2-[4¹¹-(2¹¹¹,5¹¹¹-disulphophenylazo)-2¹¹-methoxy-5¹¹-methylphenylazo]-naphthalene-3-sulphonic acid, The copper complex of 6-(4¹-amino-3¹-sulphoanilino)-1-hydroxy-2-(2¹¹-carboxyphenylazo)-naphthalene-3-sulphonic, acid, The 1:2-chromium complex of 7-amino-6¹-nitro-1,2¹-dihydroxy-2:1¹-azonaphthalene-3,4¹-disulphonic acid, The 1:2-chromium complex of 6-amino-1-hydroxy-2-(2¹-carboxyphenylazo)-naphthalene-3-sulphonic acid, The 1:2-chromium complex of 8-amino-1-hydroxy-2-(4¹-nitro-2¹-hydroxy-phenylazo)naphthalene-3,6-disulphonic acid, The 1:2-cobalt complex of 6-(4¹-amino-3¹-sulphoanilino-1-hydroxy-2-(5¹¹-chloro-2¹¹-hydroxyphenylazo)-naphthalene-3-sulphonic acid, The 1:2-chromium complex of 1-(3¹-amino-4¹-sulphophenyl)-3-methyl-4-(2¹¹-hydroxy-4¹¹-sulpho-1¹¹-naphthylazo)-5-pyrazolone, The 1:2-chromium complex of 7-(4¹-sulphoanilino)-1-hydroxy-2-(4¹¹-amino-2¹¹-carboxyphenylazo)-naphthalene-3-sulphonic acid, The 1:2-chromium complex of 1-(3¹-amino-phenyl)-3-methyl-4-(4¹¹-nitro-2¹¹-carboxyphenylazo)-5-pyrazolone.

In class 7

1-amino-4-(3¹-amino-4¹-sulphoanilino)anthraquinone-2-sulphonic acid, 1-amino-4-(4¹-amino-3¹-sulphoanilino) anthraquinone-2,5-disulphonic acid, 1-amino-4-[4¹-(4¹¹-amino-3¹-sulphophenyl)anilino]anthraquinone-2:5-disulphonic acid 1-amino-4-[4¹-(¹¹-amino-2¹¹-sulphophenylazo)anilino]-anthraquinone-2:5-disulphonic acid, 1-amino-4-(4¹-methylamino-3¹-sulphoanilino)anthraquinone-2-sulphonic acid.

In class 8

3-(3¹-amino-4¹-sulphophenyl)sulphamyl copper phthalocyanine-tri-3-sulphonic acid, Di-4-(3¹-amino-4¹-sulphophenyl)-sulphamyl copper phthalocyanine-di-4-sulphonic acid, 3-(3¹-aminophenylsulphamyl)-3-sulphamyl-copper phthalocyanine-di-3-sulphonic acid.

In class 9

4-amino-2¹-nitro-diphenylamine 3,4¹-disulphonic acid.

As amines of the formula $H_2N\text{-}R_1$ the primary amines which correspond to the substitutes $R_1$ hereinabove described are used, that is to say, for example, alkylamine, such as methylamine, ethylamine, propylamine, isopropylamine, butylamine, amylamine, β-chloro- or β-bromethylamine, β-cyanoethylamine, β-hydroxyethylamine γ-hydroxypropylamine, methoxymethylamine, β-methoxymethylamine, β-methoxypropylamine, ethoxymethylamine, β-ethoxypropylamine, γ-isopropoxypropylamine, benzylamine, or ammonia itself.

The condensation according to the invention of the compounds which contain a radical of the formula (5) or (6) with the primary amines of the formula $H_2N\text{-}R_1$ takes place likewise in organic solvents or in aqueous solution at normal or slightly elevated temperature, for example at 50° to 80°C. Addition of an acid acceptor is superfluous if the amine is present in excess.

According to a further feature of the invention there is provided a modified process for the manufacture of the new dyestuffs which is applicable for the manufacture of azo dyestuffs.

This process consists in coupling a diazotisable primary aromatic amine with a coupling component, the primary aromatic amine and the coupling component together having to contain at least one group of the formula (1).

This modified process of the invention may be conveniently brought about by adding sodium nitrite to a solution or suspension of the primary amine, which may be aminoazo compound, in a dilute aqueous solution of hydrochloric acid, adding the diazo solution or suspension so obtained to an aqueous solution of the coupling component and filtering off the dyestuff which is precipitated. If necessary sodium chloride can be added to ensure complete precipitation of all the azo dyestuff.

Those primary amines and coupling components which contain at least one group of Formula I may be obtained by condensing the corresponding primary amine or coupling component containing at least one amino group of the formula -NHR with a halide or anhydride as hereinbefore described.

If desired the new dyestuffs, as hereinbefore defined, can be isolated from the medium in which they have been formed and/or subsequently dried in the presence of a buffering agent. As examples of buffering agents which can be used for this purpose there may be mentioned buffering agents derived from phosphates such as sodium dihydrogen phosphate and disodium hydrogen phosphate, citrates such as sodium citrate, borates, and alkali metal salts of dialkylmetanilic acid such as sodium diethylmetanilate, which are preferably used in conjunction with sodium hydrogen sulphate.

The dyestuffs according to the invention which contain a reactive aziridine radical of the formula (1) can undergo ring opening when acted upon by acids and polymerise analogous to the known formation of polyethylene imines from aziridines. The resulting polymer dyestuff consists of a polyethylene imine chain to which dyestuff radicals are chemically bonded in regular intervals. If the acid catalyst polyreaction is carried out in the presence of diamines or dicarboxylic acids, these latter are incorporated into the resulting reaction product and diamino or diester compounds are obtained which are to both amino or ester groups at each dyestuff ethyleneamine radical.

The dyestuffs according to the invention are suitable for dyeing textile materials, in particular those made from nitrogen-containing fibres.

The dyestuffs can be applied to nitrogen-containing textile materials, such as wool and polyamide textile materials, from a weakly alkaline, neutral or acid dyebath. The dyeing process can be carried out at a constant or basically constant pH, or, if desired, the pH of the dyebath can be altered at any step of the dyeing process by adding acids or acid salts, or alkalis or alkaline salts.

Alternatively the new dyestuffs as hereinbefore defined, can be applied to textile materials, which are preferably cellulose textile materials, in conjunction with a resinforming composition and an acid catalyst, optionally drying the so-treated textile material, and thereafter baking the textile material at a temperature above 100°C., preferably at a temperature between 130° and 170°C.

After the drying or printing it is advisable to remove non-fixed dyestuff as completely as possible. To this end the dyeings and prints are toroughly rinsed with warm and cold water and subjected to a soaping treatment in the presence of non-ionic dispersing and/or wetting agents.

Those new dyestuffs that do not contain any water-solubilising groups, for example sulphonic acid, carboxylic acid, sulphonamide and acylsulphonamide groups are as a rule applied to the textile materials in the form of an aqueous dispersion which can be obtained by grinding the dyestuff with water in the presence of a dispersing agent. If desired, the so obtained aqueous dyestuff paste can be dried to form a redispersable powder which may be converted to a non-dusting powder by any of the processes known for forming non-dusting powders.

The dyestuffs according to the invention are especially suitable for application according to the process of solvent dyeing. The application according to this method may be effected in conventional manner by dispersing the dyestuffs in organic solvents such, for example, as perchloroethane, tetrachloroethane, trichloroethylene and in particular perchloroethylene, optionally with the addition of a dispersant such, for example, as ethyl cellulose, and treating the polyamide material to be dyed in the thus obtained dyebath at the boiling temperature of the solvent, for example for 1 hour. Subsequently the dyed fabric is rinsed in the conventional way with a solvent for the dyestuff used, for example acetone, methyl, ethyl ketone dioxan or chloroform.

The following Examples illustrate the invention, the parts and percentages being by weight unless otherwise stated.

EXAMPLE 1

6.5 Parts of 1-amino-4-((4'-dibromo-propionylaminophenylamino)-anthraquinone-[2-sulphonic acid are dissolved in 200 parts of water with heating. Upon addition of 5 parts of ethylamine (100 percent) the mixture is heated to 80°C. If no more starting dyestuff can be detected after about 5 minutes the solution is allowed to cool, treated with 2.5 percent sodium chloride, whereupon the dyestuff separates out in the form of an oil, and the solution is decanted. The residue is reprecipitated from 50 parts of water with 3 percent sodium chloride, the solution is then decanted and the precipitated product is dried in vacuo at about 40°C. The resulting dyestuff of the formula

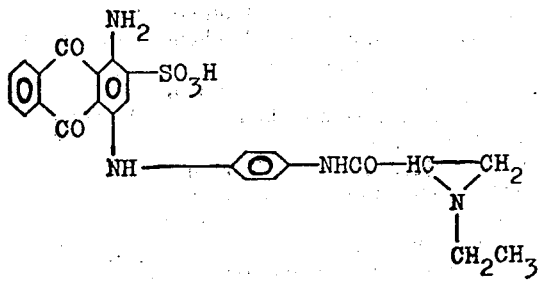

dyes wool or polyamide in blue shades.

If instead of ethylamine the same amount of methoxypropylamine is used and the process as described above is carried out, a similar dyestuff is obtained which likewise dyes wool in blue shades.

If 1-amino-4-(4'-dibromo-propionylamino-2'-sulphophenylamino)-anthraquinone-2-sulphonic acid and ammonia, ethylamine or ethanolamine are used as starting materials, and the process as described above is basically carried out in analogous fashion, dyestuffs are obtained which dye wool in blue shades.

EXAMPLE 2

10 Parts of 1-(3'-dibromo-propionylamino-6-sulphophenylazo)- 2-aminophthalene-6-sulphonic acid are dissolved in 150 parts of water at 50°C. Upon addition of 10 parts of ammonia (25 percent) the solution is heated to 80°C and then treated with a further 10 parts of ammonia. The solution is kept for about 5 minutes at 80°C and then cooled to room temperature. The product is precipitated by addition of 10 percent sodium chloride. The crystalline precipitate is filtered off, washed with 50 parts of 10 percent saline solution and dried at 40°C in vacuo.

The resulting dyestuff of the formula

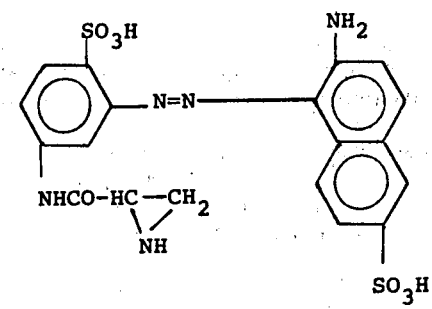

dyes wool or polyamide in orange shades

If instead of ammonia corresponding amounts of ethylamine or ethanolamine are used and the process as described above is carried out in similar fashion, dyestuffs are likewise obtained which dye wool in orange shades.

EXAMPLE 3

16 Parts of 4'-chloro-4-dimethylamino-2-dibromo-propionylamino-azobenzene are dissolved hot in a mixture of 80 parts of ethanol and 100 parts of chloroform. The solution is then mixed with 9 parts of methoxypropylamine and the mixture heated to 60°C. The reaction is completed after 5 minutes. Thereafter the solution is evaporated in vacuo at 50°C and the oily residue is rinsed with water. After standing for several hours the residue has crystallised out and is processed in the usual way to a 5 percent dispersion using a dispersing agent.

The resulting dyestuff of the formula

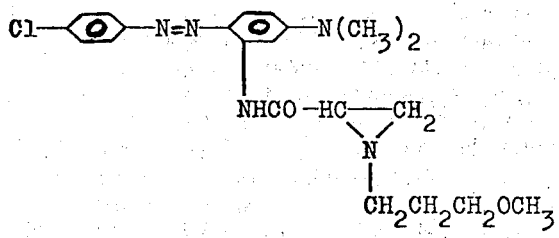

dyes wool or polyamide in yellow shades. Similar dyestuffs are obtained in corresponding manner using ethanolamine or ethylamine instead of methoxypropylamine.

EXAMPLE 4

4.8 Parts of 4'-oxaethylsulphamido-4'-chloro-4-dimethylamino-2-bromacrylamino-azobenzene are dissolved in a mixture of 40 parts of choloform and 20 parts of ethanol and to the resulting solution are added 5 parts of methoxypropylamine. The reaction is completed after 20 minutes at 25°C. The organic solvents are removed in vacuo in a bath of 40°C and the residue is dissolved in 10 parts of chloroform. The chloroform solution is washed with 100 parts of water, dried and the dyestuff is precipicipated by addition or 50 parts of ether. The filtered dyestuff is dispersed with alkyl cellulose in perchloroethylene. The resulting dispersion of the dyestuff of the formula

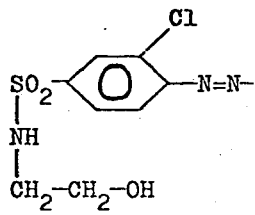

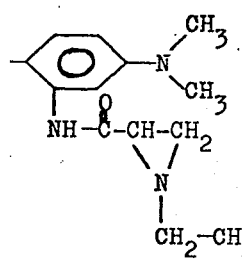

dyes polyamide from a perchloroethylene bath in orange red shades. A dyestuff with similar properties is obtained if ethylamine is used instead of methoxypropylamine.

EXAMPLE 5

6.5 Parts of 4'-dibromo-propionamino-4-dimethylamino-2-bromacrylamino-azo-benzene are dissolved in a mixture or 40 parts of chloroform and 20 parts of ethanol and to the solution are added 5 parts of ethylamine in the form of a 70 percent aqueous solution. The reaction is completed after 20 minutes at 25°C. The organic solvents and excess ethylamine are removed in vacuo in a bath of 40°C. The oily residue is stirred with ice, solidifies in the process, is filtered off, washed with water and dried in vacuo at 30°C. The dyestuff is processed in the usual manner to a 5 percent dispersion using a dispersing agent.

The resulting dyestuff of the formula

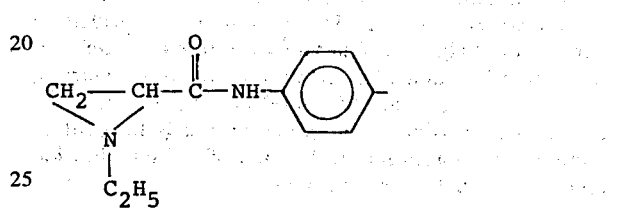

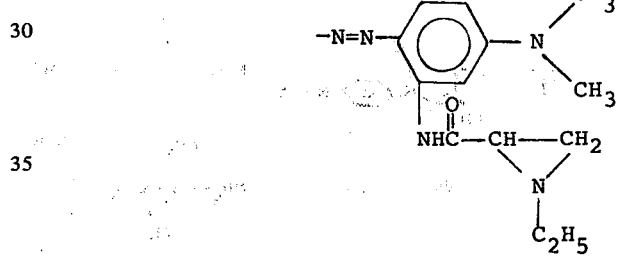

dyes polyamide in orange shades. A dyestuff possessing similar properties is obtained if methoxypropylamine is used instead of ethylamine

EXAMPLE 6

4 Parts of 4'-oxaethylsulphamido-2'-nitro-4'dimethylamino-2'-bromoacrylamino-azobenzene are dissolved in a mixture of 40 parts of chloroform and 20 parts of ethanol and to the resulting solution are added 5 parts of ethanol amine. The reaction is completed after 20 minutes at 25°C. The organic solvents are removed in vacuo in a bath of 40°C and the residue is dissolved in 20 ml of chloroform. The chloroform solution is washed with 100 parts of water, dried, and the dyestuff is precipitated by addition of 50 parts of ether. The filtered dyestuff is dispersed with ethyl cellulose in perchloroethylene.

The resulting dispersion of the dyestuff of the formula

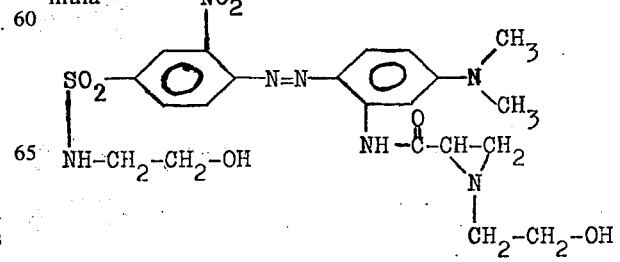

dyes polyamide from a perchloroethylene bath in bluish red shades.

Dyestuffs possessing similar properties are obtained if methoxypropylamine or ethylamine is used instead of ethanolamine.

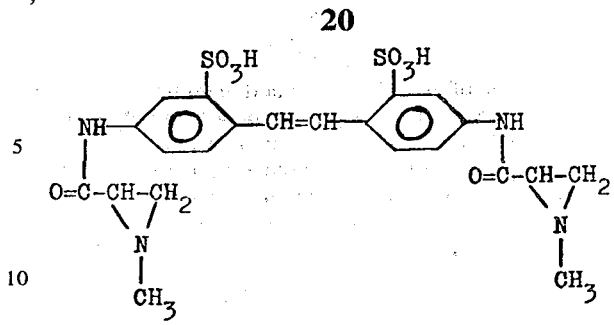

EXAMPLE 7

20 Parts of 4,4'-bis-dibromo-propionamino-stilbene-2,2'-disulphonic acid are dissolved in 100 ml of water while heating to 50°C and to the solution are added 20 parts of methylamine. The temperature rises spontaneously to 61°C and after 5 minutes no more starting material can be detected. Upon cooling, the product precipitates partially. The precipitation is brought to completion by addition of 25 parts of sodium chloride and the product of the formula is filtered off at 25°C.

From an aqueous dyebath the product is absorbed by wool and polyamide. In the succeeding dyeing with acid reactive or non-reactive dyestuffs the so treated substrate is more or less resisted depending on the amount of the above product used.

If in corresponding manner the dyestuffs indicated in the first column of following Table, wherein Ac denotes the radical -CO-CHBr-CH$_2$Br, are condensed with the amines listed in the second column, dyestuffs of the kind according to the invention are likewise obtained which dye wool or polyamide in the shades indicated in the third column.

| Dyestuff | Amine | Shade |
| --- | --- | --- |
| [structure] | NH$_2$—CH$_2$—CH$_2$—SO$_3$H | Yellow |
| do. | [structure with CH$_3$, SO$_3$H, NH$_2$-CH$_2$] | do. |
| [structure] | NH$_2$—CH$_2$—CH$_2$—NH—C(=O)—OC$_2$H$_5$ | orange |
| do. | NH$_2$—CH$_2$—CH$_2$—N(CH$_3$)$_2$ | do. |
| [structure] | NH$_2$—CH$_2$—CH$_2$—SO$_3$H | bluish red |
| do. | [structure with CH$_3$, SO$_3$H] | do. |
| do. | [structure NH$_2$-CH$_2$-CH$_2$-N with CH$_3$, OH] | do. |

-continued

| Dyestuff | Amine | Shade |
|---|---|---|
| [Cr 1:2 complex of pyrazolone azo dye with COOH and NH-Ac groups, CH₃] | $NH_2-CH_2-CH_2-CH_2-O-CH_3$ | Yellow |
| do. | [trimethyl-sulfophenyl methylamine] | do. |
| do. | $NH_2-CH_2-CH_2-SO_3H$ | do. |
| do. | $NH_2-CH_2-C_6H_4-COOCH_3$ | do. |
| [anthraquinone dye with $NH_2$, $SO_3H$, and $NH-C_6H_4-NH-Ac$ groups] | $NH_2-CH_2-CH_2-SO_3H$ | blue |
| do. | [aminoethyl pyridone with Cl, CH₃, OH] | do. |
| do. | [aminoethyl pyridone with CH₃, OH, azo-sulfophenyl-NHCOCH₃] | green |
| do. | [aminoethyl pyridone with Br, CH₃, OH, azo-sulfophenyl] | do. |

EXAMPLE 8

4.5 Parts (0.005 moles) of CuPc-[(4'-methoxy-3'-dibrom-propinoylamino-sulfamilid) (tris-sulfonic acid)] are dissolved by heating to 80° in 50 parts of water. The solution is cooled to 30° and 1.7 parts by volume (0.02 moles) of aqueous ethylamine are added with rapid stirring. The mixture is heated to 60°, kept there for 2 minutes and then allowed to cool to 40°. Stirring is continued all the time. 12.5 Parts of sodium chloride are added. The precipitated dyestuff is filtered off and washed with 20 parts by volume of brine (containig 20 percent of NaCl).

The resulting dyestuff of the formula

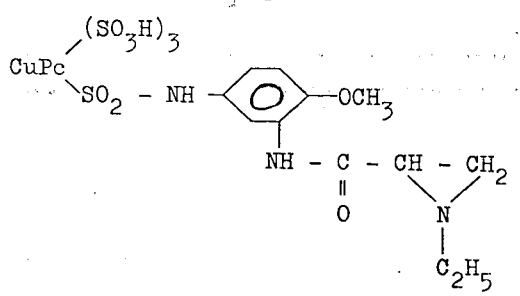

dyes wool from weakly acid bath in brilliant greenish-blue shades.

The starting material is obtained as follows: Cu Pc-(trissulfochloride-mono-sulfonic acid) is prepared in known manner by chlorosulfonation of Cu Pc -pigment at 110°–115°. The sulfochloride is reacted with 1 equivalent of 2-acetamino-4-aminoanisol, and the excess sulfochloride groups are saponified by treatment with alkali at 80°. The Cu Pc-3-acetamino-4-methoxy-sulfanilide-tris-sulfonic acid thus obtained is saponified by boiling with 2,5 N hydrochloric acid and the resulting amine is acylated with dibromopropionylchloride.

DYEING INSTRUCTION

2 Parts of the dyestuff obtained to Example 1 are dissolved in 4000 parts of watee, 10 parts of sodium sulphate are added to the solution and 100 parts of well wetted wool are put into the resulting dyebath at 40°–50°C. The bath is brought to the boil within ½ hour, dyeing is carried out for ¼ hour at the boil, then 2 parts of crystalline citric acid are added and dyestuff is carried out for a further ¾ hour at the boil. The dyed wool is initially rinsed with warm and then with cold water and dried. The wool is dyed in blue shades which are fast to washing.

A dispersion containing 2 parts of dyestuff according to Example 3 is charged into 4,000 parts of water. 4 Parts of crystalline sodium acetate are added to the turbid dye liquor and then 2 parts of acetic acid (80 percent) are added. 100 Parts polyamide fabric are previously wetted and put into the dyebath at 40°–50°C. The bath is brought to the boil within ½ hour and dyeing is carried out for 1 hour at the boil. The dyed polyamide fabric is boiled in a fresh bath for 10 minutes with 2 f/liter of soda and 0.5 g/litre of soap, then rinsed with warm and finally cold water and dried. The polyamide fabric is dyed in yellow shades possessing good fastness to wet treatments.

2 Parts of the dyestuff according to Example 2 are dissolved in 100 ml of water. 10 Parts of woolen fabric are impregnated with the solution and squeezed out to 75 percent retention of liquor. The moist fabric is wound on a spool and the spool kept for 8 hours at 80°C while rotating very gently. The fabric is boiled initially for 10 minutes at 80°C in a bath which contains 10 g/litre citric acid (crystalline) then rinsed in cold water and dried. The woolen fabric is dyed in orange shades possessing good fastness to wet treatments.

A dispersion in perchloroethylene containing 1 part of the dyestuff according to Example 6 is diluted with 100 ml of perchloroethylene and 10 parts of polyamide fabric are introduced into this dyebath. The bath is heated for 1 hour to reflux temperature (121°C) while keeping the fabric constantly in motion and the fabric is then rinsed with acetone at 20°C. The polyamide fabric is dyed in orange shades possessing good fastness to wet treatments.

We claim:

1. An anthraquinone dyestuff of the formula

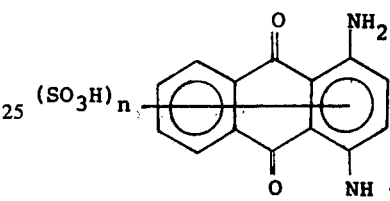

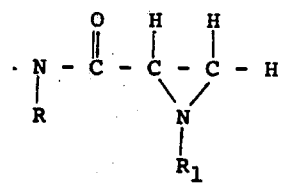

wherein
n is 1 or 2,
R is hydrogen,
$R_1$ is hydrogen; $C_1$-$C_5$-alkyl; $C_1$-$C_5$-alkyl substituted by chlorine, bromine, cyano, hydroxy, $C_1$-$C_4$-alkoxy $C_1$-$C_4$-alkoxycarbonylamino, di-$C_1$-$C_4$-alkylamino, sulfo, phenyl or phenyl substituted by $C_1$-$C_4$-alkyl, sulfo or $C_1$-$C_4$-alkoxycarbonyl and
$Z'$ is phenylene, phenylene substituted by sulfo, carboxy or methoxy or diphenylene substituted by sulfo.

* * * * *